(12) United States Patent
Rouyer et al.

(10) Patent No.: US 7,391,744 B2
(45) Date of Patent: Jun. 24, 2008

(54) ALLOCATING BRIDGE PRIORITIES IN BRIDGED NETWORK

(75) Inventors: Jessy Rouyer, Fort Worth, TX (US); Kamakshi Sridhar, Plano, TX (US); Ljubisa Tancevski, Dallas, TX (US)

(73) Assignee: Alcatel Lucent, Paris (FR)

( * ) Notice: Subject to any disclaimer, the term of this patent is extended or adjusted under 35 U.S.C. 154(b) by 681 days.

(21) Appl. No.: 10/967,873

(22) Filed: Oct. 18, 2004

(65) Prior Publication Data

US 2006/0083255 A1    Apr. 20, 2006

(51) Int. Cl.
    *G01R 31/08*    (2006.01)
(52) U.S. Cl. .................................. 370/258; 370/404
(58) Field of Classification Search ............ None
    See application file for complete search history.

(56) References Cited

U.S. PATENT DOCUMENTS

| | | | |
|---|---|---|---|
| 5,870,386 A * | 2/1999 | Perlman et al. ............ 370/256 |
| 6,144,633 A * | 11/2000 | Ikeda et al. ................ 370/217 |
| 6,373,826 B1 | 4/2002 | Russell et al. | |
| 6,633,537 B1 * | 10/2003 | Shimizu ..................... 370/216 |
| 6,717,950 B2 * | 4/2004 | Lui et al. .................... 370/408 |
| 6,879,558 B1 * | 4/2005 | Honda et al. ................ 370/222 |
| 2002/0052936 A1 | 5/2002 | Gai et al. | |
| 2002/0176373 A1 | 11/2002 | Sato | |
| 2004/0047300 A1 | 3/2004 | Enomoto et al. | |
| 2004/0264364 A1 * | 12/2004 | Sato ........................... 370/217 |
| 2007/0153921 A1 * | 7/2007 | Nakabayashi ............... 375/259 |

OTHER PUBLICATIONS

IEEE 802.1D, Jun. 2004 Media Access Control Bridges.*

* cited by examiner

*Primary Examiner*—Chau Nguyen
*Assistant Examiner*—Eunsook Choi (57) ABSTRACT

A bridged network system (20). The bridged network system comprises a plurality of bridge nodes ($N_0$-$N_7$). Each bridge node in the plurality of bridge nodes is coupled to communicate with at least one other bridge node in the plurality of nodes. Further, bridge nodes in the plurality of bridge nodes are connected to one another to form a communications-possible line of bridge nodes ($N_0$, $N_7$, $N_6$, $N_5$, $N_1$, $N_4$, $N_3$, $N_2$). Each bridge node comprises circuitry for associating a bridge priority, selected from a plurality of bridge priorities, with the respective bridge node. The plurality of bridge priorities may be arranged in an ordered sequence, but the bridge priorities associated with successive bridge nodes along the communications-possible line of bridge nodes comprises at least two discontinuities ($N_0/N_7$; $N_1/N_5$; $N_1/N_4$) in the ordered sequence.

21 Claims, 7 Drawing Sheets

ALLOCATING BRIDGE PRIORITIES IN BRIDGED NETWORK

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to allocating bridge priorities in a bridged network.

Bridged networks have found favor in many applications in the networking industry for various reasons. A bridged network generally includes a number of nodes, some of which are bridge nodes and which have connectivity to other nodes in the network. During network learning, each bridge node typically broadcasts on all of its ports, that is, the bridge node transmits the same frame data out of all of its ports. In this manner, another node that receives the frame, but which is not the destination node as indicated by information in the frame may drop the frame; in contrast, when another node receives the frame and is the intended destination node as indicated by information in the frame, that receiving node replies to the transmitting bridge node. After repeating this process with numerous frames and as between various bridge nodes, each bridge node is informed of its connectivity to other bridge nodes, such as by maintaining one or more tables that record information received, or derived from, bridge nodes that replied during the learning process. In addition to bridge nodes, the bridged network includes other nodes, which are referred to with varying names such as end user stations or client nodes. With the connectivity of the bridge nodes and client nodes, one or more bridge nodes connect two or more client nodes together and forward frames between the client nodes. Thus, the client nodes communicate with each other as if they are directly attached to the same physical network and with transparency of the bridge node(s) between them.

Within a bridged network, an additional layer of routing may be imposed. As one example, such routing is imposed with one or more spanning trees that thereby define the path along which frames may be communicated within the bridged network. Thus, each spanning tree imposes an additional level of routing restraint for a frame communicated along that tree. Typically such restraints are imposed to prevent looping of a network frame, that is, preventing multiple copies of a same frame from reaching a same bridge node, as could otherwise occur if a loop exists in the physical connectivity of the network. For example, consider a ring of bridge nodes, wherein each bridge node is connected to another bridge node and the entirety of the bridge nodes forms a ring. Without an additional constraint, if one bridge node in the ring broadcasts a frame, and assuming all nodes pass onward the broadcast frame along the ring, then two copies of the broadcast frame will reach (or "loop" to) the destination node. A spanning tree, however, defines a route as between the bridge nodes, and may be implemented in the ring as merely an imposed block between two bridge nodes on the ring. Thus, when a bridge node adjacent the block receives a frame, it is prevented from transmitting the frame onward in the direction of the block. As a result, only one copy of the broadcast frame may reach the destination node.

By way of further background, the prior art includes a different bridge priority assigned to each bridge node, and the priority affects the time for re-convergence when a failure (e.g., breakage) occurs in the bridged network. In general and as detailed below, when a failure occurs, control frames are communicated among the bridge nodes that are still connected within the spanning tree in a process known as re-convergence. For example, each control frame in one approach is known as a bridge protocol data unit ("BPDU"), which is a message that is exchanged across the bridges nodes and contains information including ports, addresses, and priorities, all of which are used to direct the frame to the proper destination. Once re-convergence is complete, a new spanning tree is established whereupon additional frames may be communicated, at least until the failure, which caused the re-convergence, is resolved. Given the existence of re-convergence, one goal in the art is to minimize the time required for a network to re-converge. Various approaches are known in the art for attempting to minimize this time. For example, in one approach to minimize the number of control frames that are exchanged, modification to the transmission limiters are used that decrease the re-convergence times. A transmission limiter is a function that attempts to limit the number of control frames (e.g., BPDUs) that are permitted to be transmitted (or generated) from a port over a given amount of time, so that the network is not overburdened at one time with too many control frames. As another example, faster re-convergence methods have been proposed for ring topologies, but only as a proprietary solution.

While the preceding concepts have proven workable in various bridged network environments, they also include drawbacks. For example, the re-convergence times in prior art approaches still may be into the range of seconds. This duration may be undesirable and indeed may be unacceptable for certain implementations. As another example, proprietary approaches for ring topologies may offer faster re-convergence, but these approaches are non-standard based proprietary solutions and are applicable only for certain ring topologies. Accordingly, greater optimization in reducing re-convergence time based on other considerations, as is achieved by the preferred embodiments, is further detailed below.

BRIEF SUMMARY OF THE INVENTION

In one preferred embodiment, there is a bridged network system. The bridged network system comprises a plurality of bridge nodes. Each bridge node in the plurality of bridge nodes is coupled to communicate with at least one other bridge node in the plurality of nodes. Further, bridge nodes in the plurality of bridge nodes are connected to one another to form a communications-possible line of bridge nodes. Each bridge node comprises circuitry for associating a bridge priority, selected from a plurality of bridge priorities, with the respective bridge node. The plurality of bridge priorities may be arranged in an ordered sequence, but the bridge priorities associated with successive bridge nodes along the communications-possible line of bridge nodes comprises at least two discontinuities in the ordered sequence.

Other aspects are also described and claimed.

DETAILED DESCRIPTION OF THE INVENTION

By way of background and contrast to various aspects of the present inventive scope, FIGS. 1a through 1h illustrate re-convergence according to an example of the prior art. Each of these Figures illustrates a same prior art network 10, shown as an example in a ring configuration and with eight bridge nodes $N_0$ through $N_7$. Thus, the following discussion first examines aspects common to all of these Figures, with a later discussion of an operational aspect that is distinguished by the different FIGS. 1b through 1h.

For sake of convention in FIGS. 1a through 1h, let the subscript, x, for each bridge node $N_x$, represent the respective bridge ID or bridge priority number. Bridge priority, in both the prior art and the preferred embodiments, is a numeric indicator that is stored at each respective node in some type of fashion as may be ascertained by one skilled in the art, and it typically is provided to the node's storage mechanism by either manual programming or some type of protocol, language, or the like that may communicate with each node—also, such functionality may be invoked by some type of system administration function, with an appropriate graphical user interface or by some type of command language. In any event, bridge priority, once stored in each node, provides control following a failure in network 10. Specifically, the bridge node with the largest priority and still having connectivity within the network is deemed the "root" of the network. In the present example and as is often the case in actual implementation, the smaller a bridge priority number the higher the corresponding actual priority, that is, the smallest priority number indicates the largest actual priority. Thus, bridge node $N_0$ has the highest actual priority with the lowest priority number of 0, bridge node $N_1$ has the next-highest actual priority and the next-to-lowest priority number of 1, and so forth through bridge node $N_7$ which has the lowest actual priority. Lastly, note that while not shown, any of the bridge nodes also may be connected to other nodes, including non-bridge nodes such as one or more client nodes.

Also in FIGS. 1a through 1h, a block B is shown between bridge nodes $N_0$ and $N_1$. Block B is determined through communications between the nodes and enforces an additional layer of routing control, as introduced above in the Background Of The Invention section of this document. In the present example, let that routing control be a spanning tree which thereby begins at node $N_0$, continues toward node $N_7$ and the nodes thereafter and then terminates at node $N_1$. As a result, network frames may be communicated only along that line of nodes and not directly between nodes $N_0$ and $N_1$. In this way, looping is prevented as also discussed in the Background.

Figure 1A:
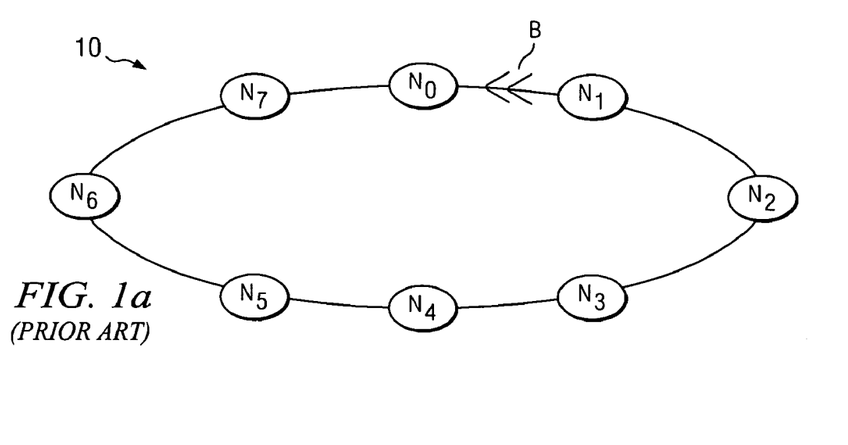
FIGS. 1a through 1h illustrate re-convergence according to an example of the prior art.
Figure 1B:
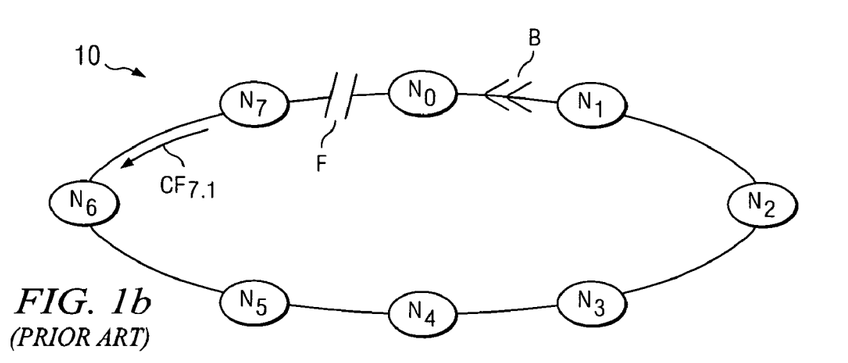

Turning now to FIG. 1b, it illustrates the beginning of a prior art root negotiation methodology in response to a failure in network 10. Specifically, in FIG. 1b, a failure F is shown to have occurred between nodes $N_7$ and $N_0$, where failure F may occur due to various types of events that break the communication between those nodes, such as a physical disruption in the link(s) between them. In any event, node $N_7$ immediately adjacent failure F detects that failure, for example in response to no longer receiving communications from the port of that node that was formerly receiving communications from the adjacent node $N_0$. As part of the root negotiation methodology, node $N_7$, in response to detecting failure F, transmits a control frame $CF_{7.1}$ in the direction away from failure F and, thus, in the example of FIG. 1b to adjacent node $N_6$. Moreover, since node $N_7$ detected failure F, node $N_7$ also asserts itself in control frame $CF_{7.1}$ to be the new root of network 10.

Figure 1C:
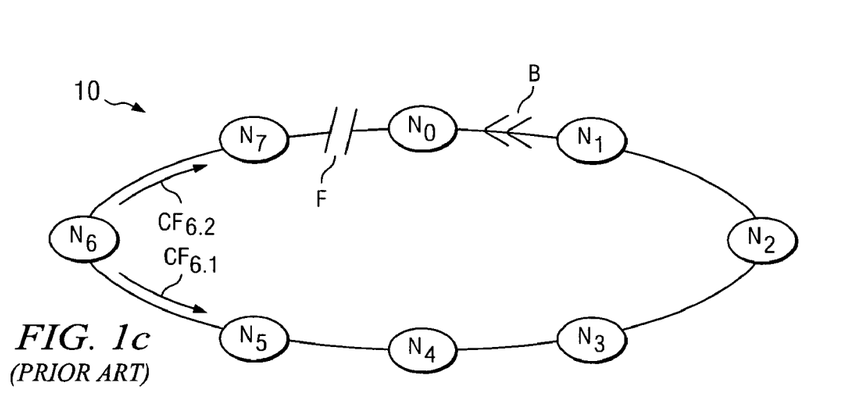

Turning now to FIG. 1c, the response of node $N_6$, having received control frame $CF_{7.1}$ from node $N_7$ in FIG. 1b, is now explored. Node $N_6$ examines information in control frame $CF_{7.1}$, and from it detects that node $N_7$ has a larger priority number (i.e., 7) than the receiving node, node $N_6$. Thus, node $N_6$, being informed that it has a smaller priority number and hence a larger actual priority than the node, node $N_7$, that transmitted the control frame, transmits control frames out of all of its communication ports to now indicate that is the root for network 10, since it perceives itself to have the lowest priority number at this point. Thus, in FIG. 1c, one control frame $CF_{6.1}$ is shown to be transmitted by node $N_6$ to node $N_5$ and another control frame $CF_{6.2}$ is shown to be transmitted by node $N_6$ to node $N_7$. Note that when node $N_7$ receives control frame $CF_{6.2}$, it observes that the node now asserting itself as the root, namely node $N_6$, indeed has a lower priority number (i.e., 6) than the receiving node $N_7$ (i.e., which has a priority number of 7). Thus, that receiving node, node $N_7$, in effect concedes its previous assertion of being the root, having now received, by way of control frame $CF_{6.2}$, notification that another node, node $N_6$, with a smaller priority number, is asserting itself as the root.

Figure 1D:
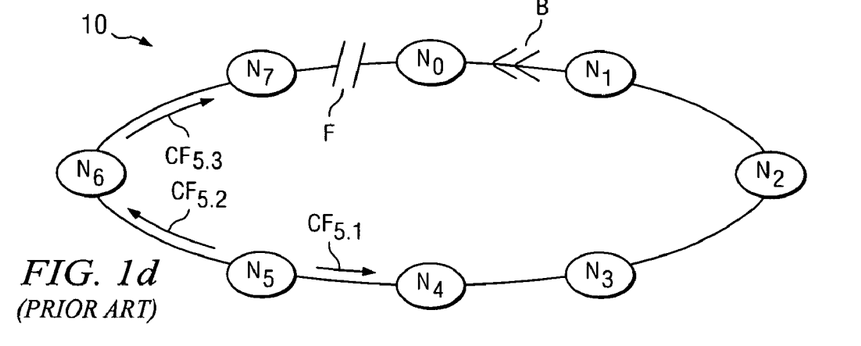

Turning now to FIG. 1d, it shows the response of node $N_5$ to receiving the control frame $CF_{6.1}$ shown in FIG. 1c, above. Particularly, node $N_5$ responds in a manner comparable to how node $N_6$ responded to control frame $CF_{7.1}$. Specifically, node $N_5$ examines information in control frame $CF_{6.1}$ and from it detects that the transmitting node, node $N_6$, has a larger priority number (i.e., 6) than the receiving node, node $N_5$. Thus, node $N_5$, being informed that it has a smaller priority number and hence a larger actual priority, transmits control frames out of all of its communication ports to now indicate that it is asserting itself as the root for network 10, since it perceives itself to have the lowest priority number at this point. Thus, in FIG. 1d, one control frame $CF_{5.2}$ is shown to be transmitted by node $N_5$ to node $N_6$ and another control frame $CF_{5.1}$ is shown to be transmitted by node $N_5$ to node $N_4$. Note that when node $N_6$ receives control frame $CF_{5.1}$, it observes that the node now asserting itself as the root, namely node $N_5$, indeed has a lower priority number (i.e., 5) than the receiving node, node $N_6$ (i.e., which has a priority number of 6). Thus, node $N_6$ in effect concedes its previous assertion of being the root, having now received, by way of control frame $CF_{5.2}$, notification that another node, node $N_5$, with a smaller priority number, is asserting itself as the root.

Continuing with FIG. 1d, in addition to the preceding, node $N_6$, having received at one port the notification from control frame $CF_{5.2}$ of the newly-established root of node $N_5$ and having conceded that new root, transmits via its other port(s) a control frame indicating this change in the root; in the example of FIG. 1d, the only other shown connected port is from node $N_6$ to node $N_7$ and, thus, node $N_6$ is shown to transmit a control frame $CF_{5.3}$ to node $N_7$. When node $N_7$ receives control frame $CF_{5.3}$, it observes that the node now asserting itself as the root, namely node $N_5$, has a lower priority number (i.e., 5) than the receiving node, node $N_7$ (i.e., which has a priority number of 7). Thus, node $N_7$ also accepts the new root. Lastly, note that node $N_7$ does not forward this information out of its non-receiving port, to node $N_0$, due to the previously-detected failure F between nodes $N_7$ and $N_0$.

Figure 1E:
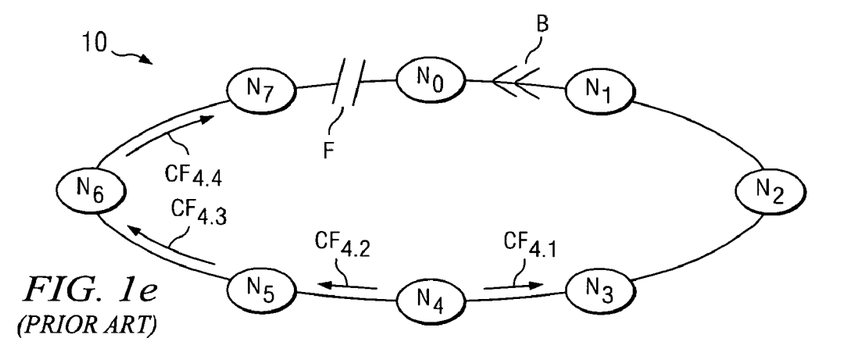

Turning now to FIG. 1e, it shows the response of node $N_4$ to receiving the control frame $CF_{5.1}$ shown in FIG. 1d, above, which one skilled in the art should now appreciate is a response comparable to how node $N_5$ in FIG. 1d responded to control frame $CF_{6.1}$ of FIG. 1c. Each actual control frame is not here discussed as it should be appreciated from the pattern and discussion provided above. Briefly, therefore, node $N_4$ examines control frame $CF_{5.1}$ and thereby detects that it, node $N_4$, has a smaller priority number (i.e., 4) than the transmitting node, node $N_5$. Further, node $N_4$, in response to its smaller priority number (and hence larger actual priority), transmits control frames out of all of its communication ports and those are shown to propagate in network 10 per the same pattern established above. Thus, control frames $CF_{4.2}$, $CF_{4.3}$ and $CF_{4.4}$ are caused to occur in the direction of failure F, with each receiving node $N_5$, $N_6$, and $N_7$, respectively, examining a received control frame and conceding that node $N_4$, with the smaller priority number, is now justified as the root. Also as in above, node $N_7$ does not forward this information out of its non-receiving port, to node $N_0$, due to the previously-detected failure F between nodes $N_7$ and $N_0$.

Figure 1F:
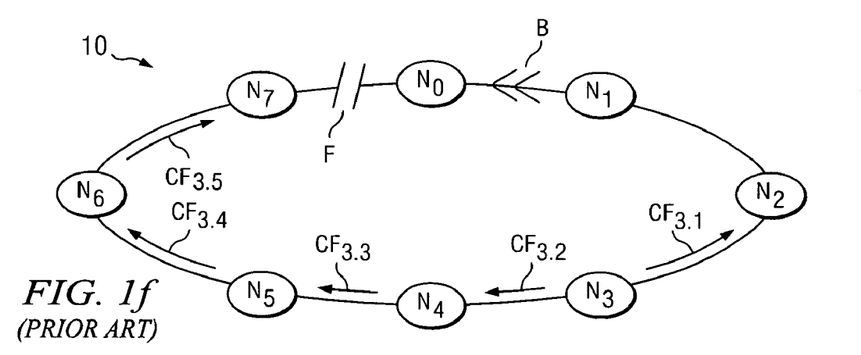

In addition to the preceding and returning to node $N_4$, it also issues a control frame asserting itself as the root, namely, control frame $CF_{4.1}$, in the opposite direction along network 10 and toward node $N_3$, which likewise will respond according to the pattern described above. More particularly, since node $N_3$ determines that it has a lower priority number, node $N_3$ responds as shown in FIG. 1f. From the above, therefore, one skilled in the art should appreciate that the same process described in connection with FIGS. 1a through 1e continues through FIG. 1h and should be understood given the above. Indeed, the entirety of FIGS. 1b through 1h may be summarized as in the following Table 1:

TABLE 1

| Figure | Node asserting itself as root | Node(s) forwarding root information in control frame | Number of control frames |
|---|---|---|---|
| 1b | $N_7$ | None | 1 |
| 1c | $N_6$ | None | 2 |
| 1d | $N_5$ | $N_6$ | 3 |
| 1e | $N_4$ | $N_5$, $N_6$ | 4 |
| 1f | $N_3$ | $N_4$, $N_5$, $N_6$ | 5 |
| 1g | $N_2$ | $N_3$, $N_4$, $N_5$, $N_6$ | 6 |
| 1h | $N_1$ | $N_2$, $N_3$, $N_4$, $N_5$, $N_6$ | 6 |

Figure 1G:
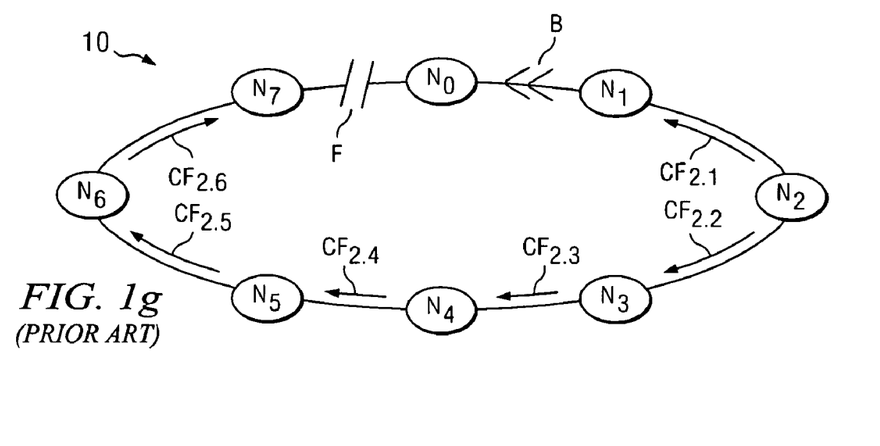
Figure 1H:
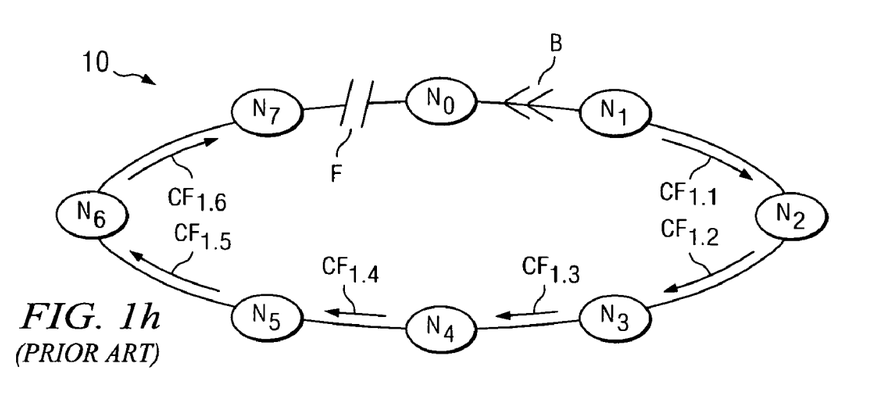

From the above, FIGS. 1b through 1h and Table 1 illustrate the complexity of root negotiation in the prior art following a failure F. Note that once FIG. 1h is reached, the best-case root is finally established in that the node, $N_1$, with the lowest priority number of those nodes connected between block B and failure F is asserted as the root. Although technically not part of the root negotiation process, note also that later nodes $N_1$ and $N_0$ may negotiate toward removing block B, after which node $N_0$ may assert itself as the root since it has a lower priority number than node $N_1$. In any event, through FIG. 1h, and as may be determined by summing the final column of Table 1, a total of 27 control frames are exchanged as part of the prior art root negotiation methodology. Such a number indicates that the re-convergence time that elapses during the communication of these frames may be considerably large and in the range of seconds. Moreover, such a number also may cause additional delays due to transmission limiters that may be included within network 10. In contrast, the preferred embodiments described below improve upon such considerations.

Also from the preceding, note that the pattern of exchanged control frames of the example of FIGS. 1a through 1h permit a generalization to be made about the total number of such frames. Specifically, for the number, NR, of nodes remaining coupled and able to communicate in a communications-possible line between block B and failure F, a total number, NCF, of control frames needed for re-convergence may be determined. Toward this end, consider the example of FIGS. 1a though 1h, where NR=7. From FIG. 1b, note that a control frame set that has one control frame, is communicated, then from FIG. 1c, note that a control frame set with two control frames is communicated, then from FIG. 1d, note that a control frame set with three control frames is communicated, and so forth. This pattern, whereby with each set of control frames one more frame is communicated, as compared to the preceding set, continues until the node with the lowest priority number in the line receives a control frame, as shown in FIG. 1g with respect to node $N_1$. At this point, such receipt occurs when a set of NR−1 control frames are communicated following the previous set of control frames. Next, and to complete the re-convergence, note that the lowest priority number node (e.g., $N_1$) responds by asserting itself as the root, causing communication of an additional NR−1 control frames in the line of connected nodes. As a result, under the illustrated prior art scenario, from FIGS. 1b through 1h, the total number of control frames to achieve re-convergence may be stated in the form of the following Equation 1:

total control frames=1+2+ . . . +(NR−1)+(NR−1)=1+
    2+ . . . +2(NR−1)                                                Equation 1

Turning now to the present inventive scope, FIGS. 2a through 2e illustrate bridge priority allocation and re-convergence according to an example of the preferred embodiments. Each of these Figures illustrates a same preferred embodiment bridged network 20, shown also as an example in a ring configuration and with eight bridge nodes $N_0$ through $N_7$, so as to facilitate a later comparison to the eight-bridge-node prior art network 10 discussed above. Thus, the following discussion first examines aspects common to all of these FIGS. 2a through 2e, with a later discussion illustrating an operational aspect that is distinguished by these Figures. Also by way of introduction, and as stated earlier, recall that bridge priority, in both the prior art and the preferred embodiments, is a numeric indicator that is first determined, and then communicated to and stored at each respective node so that the priority is thereafter associated with that respective node, the last step of which is in some type of electronic fashion as may be ascertained by one skilled in the art (e.g., memory, coded, etc.). Thus, under the preferred embodiments, the method demonstrated below is followed for determining the bridge priority for each respective node in a network, and this selection aspect of the method may be implemented manually or through an electronic device with sufficient programming or the like; thereafter, each determined priority is communicated to its respective node and stored therein. Lastly, also for sake of comparison, with respect to network 20 again a block B is established adjacent node $N_0$.

Figure 2A:
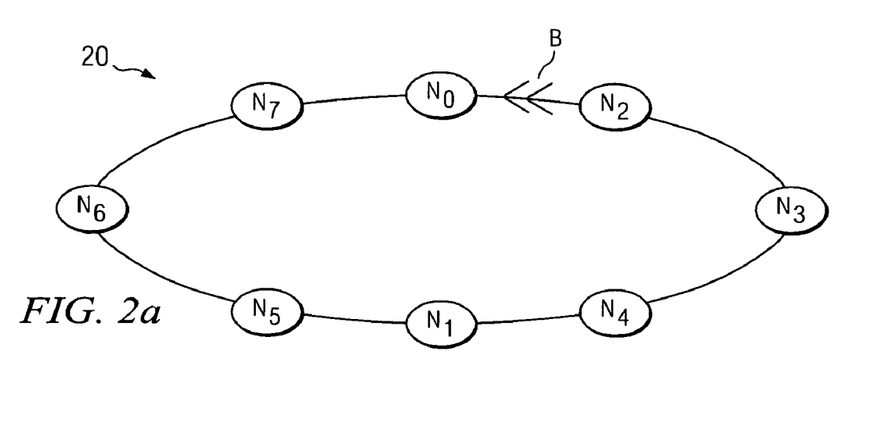
FIGS. 2a through 2e illustrate an approach for assigning bridge priority and achieving re-convergence according to an example of the preferred embodiments.

A distinction of network 20 of the preferred embodiments is that there are multiple discontinuities in the order of the priority number of each node as compared to its adjacent node, that is, with respect to each successive bridge node in the ring. Specifically, in the example network 20 of FIGS. 2a through 2e, the methodology of determining, communicating, and storing bridge priorities is such that, in the resulting network, bridge node $N_1$ is not located immediately adjacent bridge node $N_0$, but instead bridge node $N_1$ is located elsewhere as detailed below. As a result, node $N_0$ is located in a non-sequential manner in terms of the otherwise ascending (or descending, depending on direction) ordering of priority numbers, as shown in the example of FIG. 2a where node $N_1$ is located between bridge nodes $N_4$ and $N_5$, unlike the example network 10 of the prior art wherein bridge node $N_1$ is sequentially located adjacent between bridge nodes $N_0$ and $N_1$ where there is no interruption of bridge priority ascension between nodes $N_4$ and $N_5$. In other words, where in the prior art there may be sequential ordering of bridge priority number in the ring network from bridge nodes $N_0$, to $N_1$, to $N_2$, to $N_3$, and so forth all the way up to bridge node $N_7$, in the preferred embodiments there is a discontinuity in the ordering of priority number between each of nodes $N_4$ and $N_5$ with respect to node $N_1$, since it is located between those two nodes. Thus, in the preferred embodiments, in addition to a discontinuity that may occur at the lowest priority node, $N_0$, and a respective adjacent node (e.g., $N_7$), there is at least two discontinuities provided by re-locating another relatively low priority number node (e.g., node $N_2$). Thus, in FIG. 2a, there is again a discontinuity in the ordering of bridge priority number between nodes $N_0$ and $N_7$. In addition, however, bridge node $N_1$ is adjacent bridge node $N_4$ and, thus, at that discontinuity formed by the adjacent bridge nodes $N_1$ and $N_4$, three priority levels separate those adjacent bridge nodes (i.e., three priorities between priority 1 and priority 4). In addition, bridge node $N_1$ is adjacent bridge node $N_5$ and, thus, at that discontinuity formed by the adjacent bridge nodes $N_1$ and $N_5$, four priority levels separate those adjacent bridge nodes. In another discontinuity instance, bridge node $N_2$ is adjacent bridge node $N_0$ and, thus, two priority levels also separate those adjacent bridge nodes. Thus, in each of these cases, where the bridge priority is recognized as an integer value, the difference between the respective priority number of two adjacent nodes, at the location of the discontinuity, is greater than one. The effects of these discontinuities in bridge priority are explored below and are shown to provide a considerable benefit over the prior art.

Figure 2B:
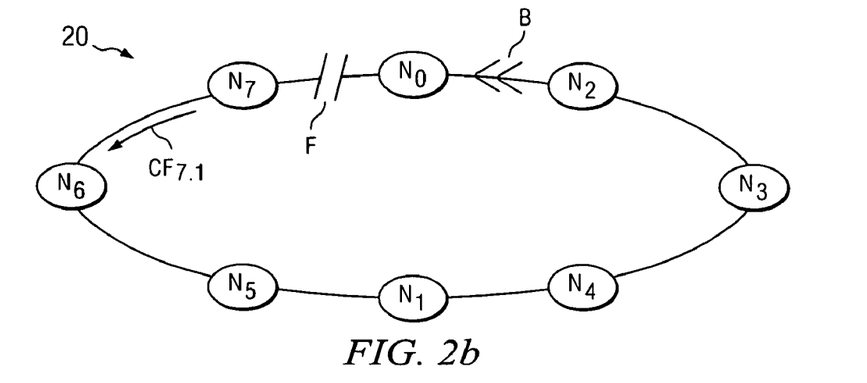

FIGS. 2b through 2e illustrate an example of re-convergence for network 20 by root negotiation following a failure F, which for sake of comparison is shown to occur between nodes $N_0$ and $N_7$ in FIGS. 2b through 2e, as was the case for prior art network 10 in FIGS. 1b through 1h. Looking to the remainder of FIG. 2b, it illustrates the beginning of the preferred embodiment root negotiation methodology in response to failure F in network 20. In general, the manner of responding by each bridge node is comparable to that of the prior art, but where differences arise is in the location of the discontinuities in bridge priorities between adjacent bridge nodes and the effect that has on overall re-convergence. Primarily, each bridge node operates as described above with respect to the prior art, that is, to either: (1) detect a failure and to assert itself as a root; or (2) to receive a control frame and, if it indicates a higher priority number, to assert itself as the root by transmitting one or more new control frames; or (3) to receive a control frame and, if it indicates a lower priority number, then to concede the root asserted in that frame and to pass the notification onward out of its ports, if any, that did not receive the frame. All of these operations are also constrained in that a control frame is not transmitted from a port in the direction of an adjacent block or failure. Thus, in the example of FIG. 2b, the response of network 20 is the same as that of network 10 in FIG. 1b. Briefly re-visiting that response, therefore, node $N_7$ immediately adjacent failure F detects that failure and, as part of the root negotiation methodology, in response node $N_7$ transmits a control frame $CF_{7.1}$ to any port not connected to failure F, which in the example of FIG. 2b is along the port that communicates to the adjacent node $N_6$. Moreover, since node $N_7$ detected failure F, node $N_7$ also asserts itself in control frame $CF_{7.1}$ to be the new root of network 20.

Figure 2C:
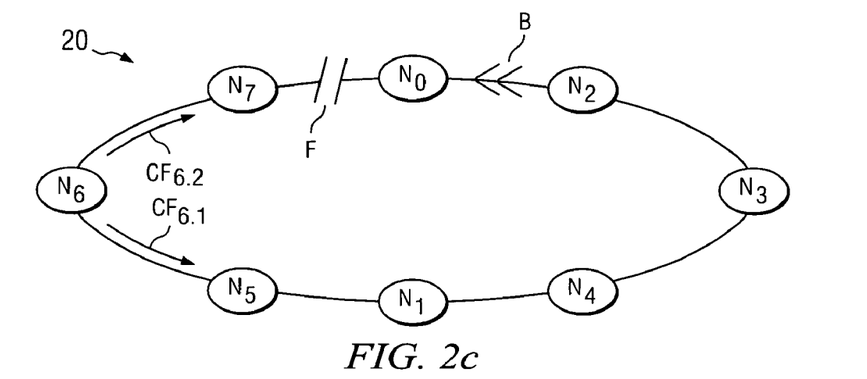
Figure 2D:
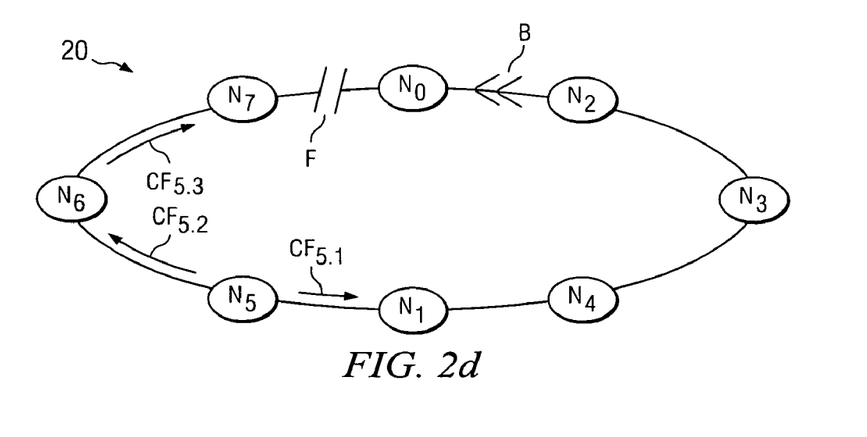

Given the preceding, one skilled in the art will appreciate that the root negotiation methodology of inventive network 20 of FIGS. 2c and 2d are the same as that shown of network 10 in FIGS. 1c and 1d, respectively. Thus, the following discussion briefly reviews that portion of the methodology and the reader is referred to the earlier discussion of the latter for more details. Looking then collectively to FIGS. 2c and 2d, one skilled in the art will appreciate that with each Figure, respectively, node $N_6$, then node $N_5$, receives a control frame indicating that a bridge node with a higher priority number is asserting itself as a root, and each such receiving node, if the receiving node has a lower priority number, in response asserts itself in its own control frame(s) as the root; moreover, any node receiving a control frame, where that frame has a lower priority number than the receiving node, accepts the root designated therein and transmits onward a control frame to any adjacent node from which it did not just receive a control frame, up until the control frames reach bridge node $N_7$, which does not further transmit the root assertion onward because it has detected failure F in the direction to which it otherwise would transmit that assertion.

Figure 2E:
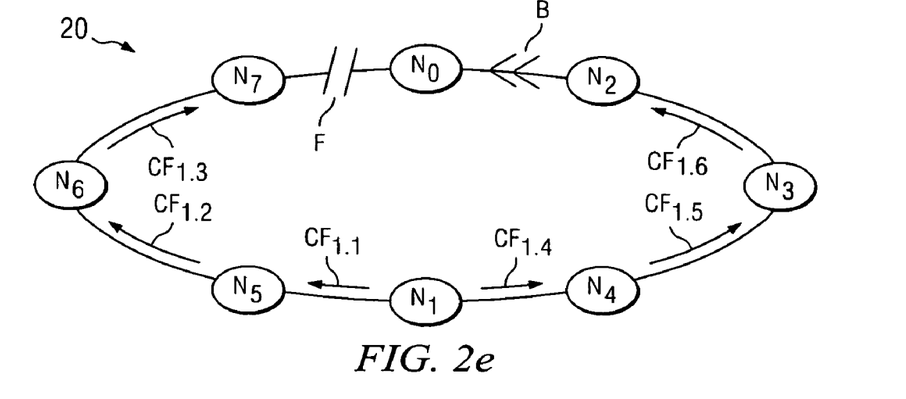

Turning to FIG. 2e, it illustrates the root negotiation methodology and its effect in the preferred embodiments, where that effect is altered as compared to the prior art due to the discontinuity in the integer sequence of bridge priorities between nodes $N_5$ and $N_1$. Particularly, as shown in FIG. 2d, note that node $N_1$ receives a control frame $CF_{5.1}$, wherein node $N_5$ asserts itself as the root. Node $N_1$ examines the information in that control frame $CF_{5.1}$ and from it detects that the transmitting node, node $N_5$, has a larger actual priority number (i.e., 5) than the receiving node, node $N_1$. Thus, node $N_1$, being informed that it has a smaller priority number and hence a larger actual priority, transmits control frames out of all of its communication ports to now assert that it is the root for network 20, since it perceives itself to have the lowest priority number at this point. Thus, in FIG. 2e, one control frame $CF_{1.1}$ is shown to be transmitted by node $N_1$ to node $N_5$ and another frame $CF_{1.4}$ is shown to be transmitted by node $N_1$ to node $N_4$. Note, however, that the priority number of the now-asserting node (i.e., of 1) is lower than any other bridge node that is reachable through the linked nodes, in their current form given the locations of failure F and block B. In other words, with respect to control frame $CF_{1.1}$, it reaches a higher priority number node $N_5$, which in response accepts the newly asserted root of priority 1 and transmits a control frame $CF_{1.2}$ to node $N_6$, which in response accepts the newly asserted root of priority 1 and transmits a control frame $CF_{1.3}$ to node $N_7$, which does not transmit because it otherwise is connected to the adjacent failure F. Similarly, with respect to control frame $CF_{1.4}$, it reaches a higher priority number node $N_4$, which in response accepts the newly asserted root of priority 1 and transmits a control frame $CF_{1.5}$ to node $N_3$, which in response accepts the newly asserted root of priority 1 and transmits a control frame $CF_{1.6}$ to node $N_2$, which does not transmit because it otherwise is connected to the adjacent block B.

Given the above illustration and discussion of FIGS. 2a through 2e, the assertion of a node as root, and the forwarding of that root information by nodes with higher priority numbers, then the total number of control frames may be summarized in table form as was done in Table 1 for the prior art, but now in Table 2 with respect to an example of the preferred embodiments:

TABLE 2

| Figure | Node asserting itself as root | Node(s) forwarding root information in control frame | Number of control frames |
|---|---|---|---|
| 2b | $N_7$ | None | 1 |
| 2c | $N_6$ | None | 2 |
| 2d | $N_5$ | $N_6$ | 3 |
| 2e | $N_1$ | $N_5, N_6, N_4, N_3$ | 6 |

From FIGS. 2b through 2e and Table 2, the preferred embodiments considerably reduce the complexity of root negotiation following a failure F. While FIGS. 2b and 2c are comparable to FIGS. 1b and 1c, once the control frame $CF_{5.1}$ of FIG. 2d reaches node $N_1$, then the response of FIG. 2e is far less complex than that required by FIGS. 1d through 1h of the prior art. Indeed, recalling that the prior art required an exchange of a total of 27 control frames in its root negotiation methodology, in contrast the preceding Figures as well as a sum of the right column of Table 2 indicate that only 12 control frames are required in the root negotiation methodology of the preferred embodiments. Thus, in this example, a reduction on the order of 56% is achieved in the number of control frames for network 20 to re-converge as compared to the prior art network 10. Moreover, depending on the location and configuration of any transmission limiters in network 20, the actual improvement may be even greater than this measure depending on the effect such limiters may otherwise impose, including interruptions and the like. Overall, therefore, the re-convergence performance of the preferred embodiments is considerably improved.

From the preceding, one skilled in the art may now appreciate in an overall sense a benefit of the preferred embodiments. Specifically, by providing discontinuities in the order of priority numbers of successive nodes in a line, when a failure occurs in the network, a discontinuity may drastically reduce the amount of control frames that are required during re-convergence, once the control frames reach the node that provides the discontinuity. The chances of a discontinuity being reached, with fewer exchanged control frames as compared to the prior art, are improved in that there is an equal probability that a failure can occur on either "side" of the discontinuity, that is, in either line of nodes connected to either port of the discontinuity-providing node. Such an example is shown in FIGS. 2d and 2e, wherein node $N_1$ provides the discontinuity with respect to both nodes $N_4$ and $N_5$ and when, in response to receiving control frame $CF_{5.1}$, node $N_1$ responds by asserting itself as the root causing additional control frames to be transmitted only to notify the other nodes of this assertion, but without any one or additional nodes then asserting itself as the root due to the low priority number of the discontinuity-providing node $N_1$.

Having demonstrated one preferred embodiment of network 20, attention is now directed to a preferred embodiment method for determining bridge priorities consistent with the above. In the preferred embodiment method as applied to network 20, the determination applies to a number M of nodes in such a network, where as a first example, these M nodes are in a ring. Later, these M nodes are shown to be in a form that was introduced earlier as a communications-possible line, where such a line for purposes of this document occurs in any network whereby a given node communication (e.g., frame) may be made from a first node to a second node along that line and possibly through one or more intermediate nodes connected between the first and second nodes, but where the given communication is not received more than once by any of the intermediate nodes or the second node. In any event, the bridge priorities preferably are determined for each node in the ring (or communications-possible line) so as to separate the lowest priority number bridge node from the position of the next-lowest priority number bridge node such that those two nodes have at least one node between them and so that discontinuities are established as introduced above and as further detailed below.

The preceding principles are now explored by way of an example, in a ring network, and may be considered even without regard to the location of a block in the ring (for example, before the location of a block is established). In the preferred embodiment, a group G with a number g of nodes and having the highest actual priorities (i.e., lowest priority numbers), out of all nodes in the ring (or in a communications-possible line), is identified as desirable for being dispersed throughout the ring (or line). Thereafter, the priorities of the nodes in group G are located so as to reduce the number of control frames that are communicated during re-convergence, such as in the example of FIGS. 2a through 2e. In the case of network 20, by way of example the value of g is selected to be equal to two. Thus, the group G consists of the nodes having the two highest actual priorities (i.e., two lowest priority numbers), namely nodes $N_0$ and $N_1$, are identified. Next, the priorities of each node in the group G nodes is located and distanced along the ring (or line) by at least one intermediate node, that is, so that there will be at least one non-group G node between two group G nodes. Indeed, in a preferred embodiment and to the extent that the ring (or line) is evenly-dividable, each of the g nodes in group G is separated from any other node in that group G by a number of nodes, S, shown in the following Equation 2:

$$S = \frac{M}{g} - 1 \qquad \text{Equation 2}$$

Applying Equation 2 to the example of network 20, that network includes a total of M=8 nodes, and recall in the present example g=2. Thus, substituting these values into Equation 2 solves for S as show in the following Equation 2.1:

$$S = \frac{M}{g} - 1 = \frac{8}{2} - 1 = 3 \qquad \text{Equation 2.1}$$

With the result from Equation 2.1, in order to locate each node in the group G, they are situated so that there are S=3 non-group G nodes between them and any other node from that group G. In the specific case, looking to FIG. 2a, note therefore that there are S=3 non-group G nodes between the group G nodes $N_0$ and $N_1$, in either direction. Specifically, looking clockwise from node $N_0$ to node $N_1$, there are three non-group G nodes $N_2$, $N_3$, and $N_4$ between them. Similarly, looking counterclockwise from group G node $N_0$ to group G node $N_1$, there also are three non-group G nodes between them, namely, nodes $N_7$, $N_6$, and $N_5$.

Before proceeding with examples of the preferred embodiments in other networks, note that in the preferred embodiments various manner may be implemented to locate, within a network, the non-group G (i.e., the M-g nodes, out of the M nodes, that are not in the group of g lowest-priority-number nodes). For example, in network 20, for those additional nodes (i.e., nodes $N_2$ through $N_7$), they are situated in positions such that, in a clockwise manner, the priority number successively increases with each node and with the exception of not interfering with the location of any of the g nodes. Thus, beginning clockwise from node $N_0$, the first node not in the g nodes is node $N_2$, and it is situated adjacent node $N_0$. Continuing clockwise, the priority number successively increases such that the next adjacent node is node $N_3$, followed in like fashion by node $N_4$. Next, however, is the position of node $N_1$, which as described above is so located because it is in the group G nodes. Continuing clockwise after that node, $N_1$, again the priority numbers successively increase, such that node $N_5$ is adjacent node $N_1$, node $N_6$ is adjacent node $N_5$, and node $N_7$ is adjacent node $N_6$. In an alternative embodiment, other approaches may be implemented for locating these non-group G nodes. For example, ascending priority numbers again may be used, but in a counterclockwise fashion from node $N_0$. Still other examples will be ascertainable by one skilled in the art.

Figure 3:
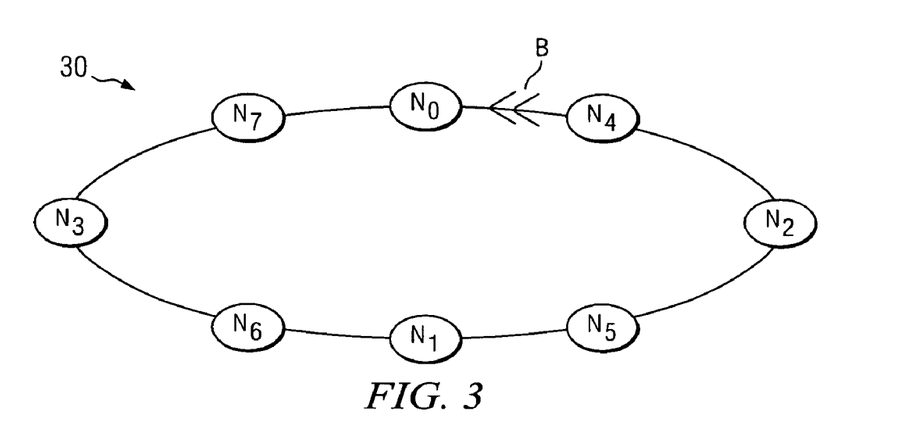
FIG. 3 illustrates bridge priority allocation according to the preferred embodiment in an alternative ring network with eight nodes and with four high priority nodes dispersed along the ring.

FIG. 3 illustrates bridge priority allocation method according to the preferred embodiment in a resulting network 30 having M=8 nodes, but in the example of FIG. 3, the group G has a number g of nodes with highest actual priority selected to be four, rather than two as it was in network 20. Thus, the group G nodes are nodes $N_0$, $N_1$, $N_2$, and $N_3$. Moreover, according to Equation 2, the spacing S between any two nodes in the g=4 group G nodes is equal to one, as shown in the following Equation 2.2:

$$S = \frac{M}{g} - 1 = \frac{8}{4} - 1 = 1 \quad \text{Equation 2.2}$$

Looking then at network 30 and recognizing the implementation of these aspects, from node $N_0$ and moving clockwise, there is S=1 non-group G node, namely the one node $N_4$, separating the two group G nodes, node $N_0$ and node $N_2$. Similarly, there is S=1 node, namely the one node $N_5$, separating the two nodes, node $N_2$ and node $N_1$. Continuing clockwise in this manner, there is S=1 non-group G node, namely the one node $N_6$, separating the two group G nodes, node $N_1$ and node $N_3$, and there is S=1 non-group G node, namely the one node $N_7$, separating the two group G nodes, node $N_3$ and node $N_0$. Note also that for the M-g=4 non-group G nodes, they are located such that the priority numbers ascend sequentially in a clockwise fashion, with priority discontinuities at each of the interspersed group G nodes. Thus, the preferred embodiment aspects, introduced above with respect to network 20, are successfully implemented in network 30.

Network 30 illustrates another preferred embodiment aspect with respect to spacing of nodes within the group G nodes. Particularly, in the preferred embodiment, for the two nodes in that group G having the highest actual priority (i.e., lowest respective priority numbers), those two nodes are separated by a maximum number of nodes from one another, while still complying with the additional allocation methodology set forth above. Thus, while network 30 successfully implements a spacing of S (e.g., S=1) non-group G nodes between each group G node, the two highest actual priority (i.e., lowest priority number) nodes, $N_0$ and $N_1$, are three nodes apart from one another, which is the maximum spacing permitted while still complying with the remaining above-described methodology. This maximum, MX, is established at (M/2)−1 when M is an even number. When M is an odd number, then this maximum, MX, will differ in one direction (e.g., clockwise) between these two nodes versus the other direction (e.g., counterclockwise), where preferably the difference is only by one node. Thus, there will be MX nodes between nodes $N_0$ and $N_1$ in one direction and MX±1 nodes in the other direction. Also in this case, MX may be approximates as [(M±1)/2]−1. In any event, this aspect of spacing at MX increases the chances of a later fault occurring closer, in terms of a number of nodes, to one of these two highest priority nodes, thereby reducing overall re-convergence time.

Figure 4:
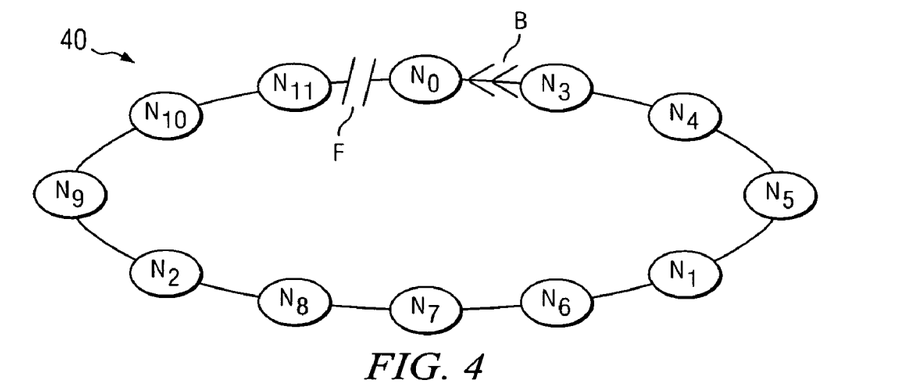
FIG. 4 illustrates bridge priority allocation according to the preferred embodiment in an alternative ring network with twelve nodes and with three high priority nodes dispersed along the ring.

FIG. 4 illustrates bridge priority allocation according to the preferred embodiment method in a resulting network 40 having M=12 nodes, but in the example of FIG. 4, the number g of nodes in the group G nodes is selected to be on odd number, namely, g=3. Thus, the group G nodes, having the three highest actual priorities (i.e., lowest priority numbers), consists of nodes $N_0$, $N_1$, and $N_2$. Moreover, according to Equation 2, the spacing S between the three highest actual priority nodes in the g=3 nodes is equal to three, as shown in the following Equation 2.3:

$$S = \frac{M}{g} - 1 = \frac{12}{3} - 1 = 3 \quad \text{Equation 2.3}$$

Looking then at network 40 and recognizing the implementation of these aspects, from node $N_0$ and moving clockwise, there are S=3 non-group G nodes, namely nodes $N_3$, $N_4$, and $N_5$, separating the two group G nodes, node $N_0$ and node $N_1$. Similarly, there are S=3 non-group G nodes, namely nodes $N_6$, $N_7$, and $N_8$, separating the two group G nodes, node $N_1$ and node $N_2$. Completing the clockwise analysis in this manner, there are S=3 non-group G nodes, namely nodes $N_9$, $N_{10}$, and $N_{11}$, separating the two group G nodes, node $N_2$ and node $N_0$. Also for the 9 non-group G (i.e., M-g=9) nodes, they are located such that the priority numbers ascend sequentially in a clockwise fashion, with priority discontinuities at each of the interspersed group G nodes. Thus, all of the preferred embodiment aspects, introduced above with respect to network 20, are successfully implemented in network 40.

Figure 5:
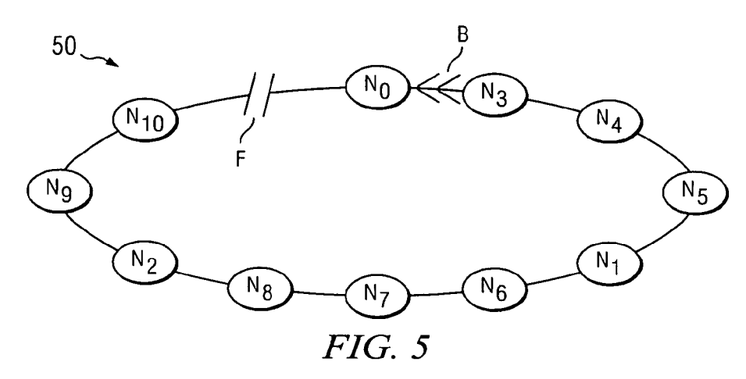
FIG. 5 illustrates bridge priority allocation according to the preferred embodiment in an alternative ring network with eleven nodes and with three high priority nodes dispersed along the ring.

FIG. 5 illustrates a network 50 and demonstrates another aspect that may arise when allocating bridge priorities according to the preferred embodiment method. Particularly, by way of background, note in the previous examples that M/g is an exact integer, where in the example of network 20, M/g=8/2=4, in the example of network 30, M/g=8/4=2, and in the example of network 40, M/g=12/3=4. However, in some networks, M/g is not an exact integer, as in the case of network 50 of FIG. 5. Specifically, in the example of network 50, M=11 and g=3; thus, M/g=3.67. In this instance of a non-integer M/g, then preferably the definition of S may be re-stated, as shown in the following Equation 3:

$$S = \text{round}\left(\frac{M}{g}\right) - 1 \qquad \text{Equation 3}$$

In Equation 3, therefore, the value of $$\left(\frac{M}{g}\right)$$

is rounded in order to determine the value of S. Accordingly, in the present example for network 50, then S is as shown in the following Equation 3.1:

$$S = \text{round}\left(\frac{M}{g}\right) - 1 = \text{round}\left(\frac{11}{3}\right) - 1 = 4 - 1 = 3 \qquad \text{Equation 3.1}$$

In actuality, Equation 3 also holds true for the case when M/g is an integer, because the rounding function simply provides that same integer as the result of Equation 2.

Looking now specifically to network 50 given that S=3, note that indeed there are S=3 non-group G nodes nodes, $N_3$, $N_4$, and $N_5$, between the highest actual priority node, $N_0$, and another node, $N_1$, in the group G nodes. Similarly, there are S=3 non-group G nodes, $N_6$, $N_7$, and $N_8$, between node, $N_1$, and another node, $N_2$, in the group G nodes. However, network 50 further illustrates that, when M/g is not an exact integer, while the spacing is still such that preferably there are S nodes between at least some, if not most, of the different group G nodes, the non-integer M/g will cause at least two nodes in that group to have fewer than S non-group G nodes between them. Particularly, in the example of network 50, note that there are only two nodes, $N_9$ and $N_{10}$, between group G node $N_2$ and group G node $N_0$, even though S=3 for that example. Nonetheless, benefits are still achieved as compared to the prior art.

The methodology of determining bridge priorities and communicating them to the bridge nodes so as to provide a discontinuity in the ordered sequence of priorities of successive nodes in a ring (or communications-possible line alone or in a ring) may be expanded in the preferred embodiments for networks with a larger number of nodes. However, the number of discontinuities also is preferably limited so as to avoid going beyond a point of dishing returns. In this regard, in the preferred embodiments, the number of generated control frames is a function $f$ as shown in the following Equation 4:

$$f = (M/g - 1) + g/2 \qquad \text{Equation 4}$$

To find an optimum for Equation 4, the minimum of that function $f$ is determined and, thus, the optimum for g occurs as shown in the following Equation 5:

$$g = \sqrt{2M} \qquad \text{Equation 5}$$

To have solely an integer result for g, Equation 5 requires that 2M have an integer square root, or as an alternative if this is not the case then g may simply be the integer portion of the solution of Equation 5.

Figure 6:
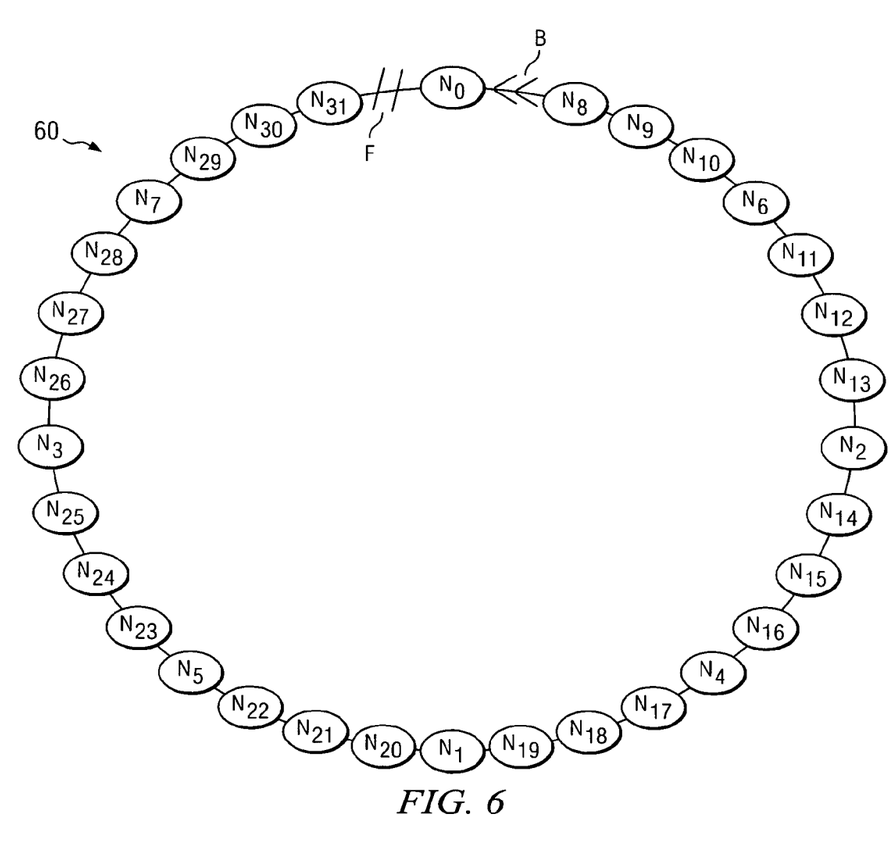
FIG. 6 illustrates bridge priority allocation according to the preferred embodiment in an alternative ring network with thirty-two nodes and with eight high priority nodes dispersed along the ring.

By way of an illustration of Equation 5 as well as the preceding principles, FIG. 6 illustrates bridge priority allocation according to the preferred embodiment method in a network 60 having M=32 nodes. According to Equation 5, therefore, the value of g is as shown in the following Equation 5.1:

$$g = \sqrt{2M} = \sqrt{2*32} = \sqrt{64} = 8 \qquad \text{Equation 5.1}$$

Thus, the group G nodes consists of g=8 nodes starting with node $N_0$. Moreover, according to Equation 2, the spacing S between the g=8 highest actual priority nodes is as shown in the following Equation 2.4:

$$S = \frac{M}{g} - 1 = \frac{32}{8} - 1 = 3 \qquad \text{Equation 2.4}$$

In the example, again M/g is an integer (i.e., M/g=4) and, thus, each node in the group G nodes is separated along the ring in network 60 by three non-group G nodes. Looking then at network 60 and recognizing the implementation of these aspects, from node $N_0$ and moving clockwise, there are S=3 non-group G nodes, namely nodes $N_8$, $N_9$, and $N_{10}$, separating the two group G nodes, node $N_0$ and node $N_6$. Note, further, however, that node $N_1$ is located per the preferred embodiment methodology asserted earlier, namely, such that the nodes $N_0$ and $N_1$ (i.e., the two nodes in group G having the highest actual priority) are separated by a maximum number of nodes from one another, while still complying with the additional allocation methodology; thus, in network 60, there are (M/2)−1=(32/2)−1=15 nodes between group G nodes $N_0$ and $N_1$. The remaining group G nodes (i.e., nodes $N_2$, $N_3$, $N_4$, $N_5$, $N_6$, and $N_7$) may be dispersed according to various techniques, while preferably having S=3 non-group G nodes between each set of two nodes in that group. From a careful review of network 60, one skilled in the art will confirm that such a methodology is satisfied.

Having demonstrated numerous aspects of the preferred embodiments, recall that earlier it was mentioned that the nodes in a ring also may be described as a communications-possible line, where such a line was defined as occurring in any network whereby a given node communication may be made from a first node to a second node along a line and possibly through one or more intermediate nodes connected between the first and second nodes, but where the given communication is not received more than once by any of the intermediate nodes or the second node. Such a communications-possible line exists in each of the ring networks illustrated above by virtue of the block B in each such network. For example, in network 20 of FIG. 2*a*, such a line may be seen as determined from node $N_0$ in a counterclockwise direction, that is, in the opposite direction from block B. Particularly, within that ring network 20, and starting with node $N_0$, a communications-possible line is effectively created and has the order of nodes shown in the following Table 3, with position numbers for the sake of reference:

TABLE 3

| | Position | | | | | | | |
|---|---|---|---|---|---|---|---|---|
| | 1 | 2 | 3 | 4 | 5 | 6 | 7 | 8 |
| Node | $N_0$ | $N_7$ | $N_6$ | $N_5$ | $N_1$ | $N_4$ | $N_3$ | $N_2$ |

Figure 7:
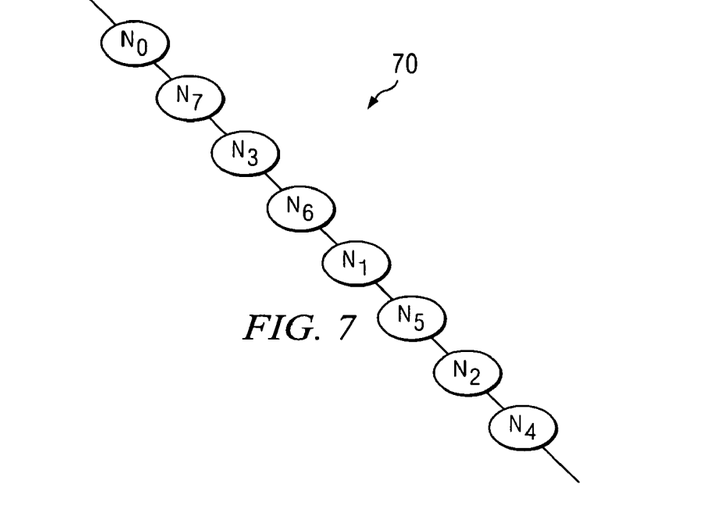
FIG. 7 illustrates bridge priority allocation according to the preferred embodiment in a communications-possible line of nodes and with two high priority nodes dispersed along the line.

From Table 3, the previously-made observations with respect to the preferred embodiment methodology for locating bridge priorities with respect to network 20 may be confirmed in the communications-possible line. Particularly, recall that Equation 2.1 in that example produced a value of S=3, that is, the group G nodes were situated so that there are S=3 non-group G nodes between them and any other node from that group G. In the analysis of viewing those nodes as a line as shown in Table 3, then S=3 non-group G nodes between the G group node $N_0$ at position 1 and the group G node $N_1$ at position 5; particularly, between these two nodes are three non-group G nodes, which starting closest to node $N_0$ are nodes $N_7$, $N_6$, and $N_5$. Note also that from group G node $N_1$ through the end of the line, again there are S=3 non-group G nodes. Specifically, starting at group G node $N_1$ and going in a direction toward the end of the communications-possible line, there are three non-group G nodes $N_2$, $N_3$, and $N_4$. Lastly, to further illustrate this aspect, FIG. 7 illustrates a network 70 that may be part of another network (e.g., mesh network) or may stand alone for purposes of communications such as being defined by a spanning tree or the like in a given network. The node ordering of network 70 is that shown in Table 3, that is, it provides the same communications-possible line as well as the S=3 non-group G node spacing between node $N_0$ at one end of the line and $N_1$ away from node $N_0$, separated by S=3 non-group G nodes between group G nodes $N_0$ and $N_1$ and from node $N_1$ to the end of that line.

Figure 8:
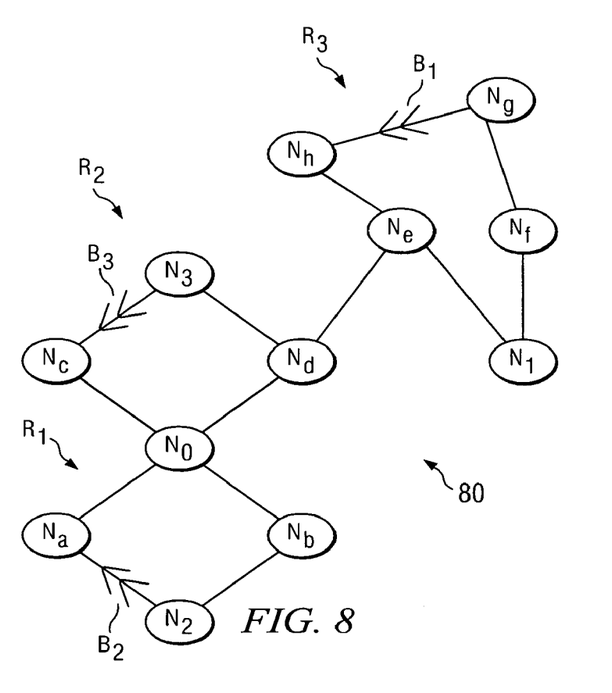
FIG. 8 illustrates a mesh network and which further demonstrates the preferred embodiments.

FIG. 8 illustrates a mesh network designated generally at 80, and which further demonstrates that the preferred embodiments may be implemented in such a network according to the various methods described above. In general, network 80 is shown to include three blocks $B_1$, $B_2$, and $B_3$, and 12 nodes; with respect to the latter, only those with a priority of interest for sake of the discussion are labeled with a numeric priority, while the other nodes are labeled with an "N" combined with a lower case letter subscript. Looking then at the more noteworthy nodes, node $N_0$, having the lowest priority, has a location wherein it is included as part of two possible rings $R_1$ and $R_2$ and is further connected, via a node $N_d$, to a third ring $R_3$ as well. Each block $B_x$ operates as described above, to prevent looping of a frame on network 80. In addition, per the preferred embodiments, note that the longest communications-possible line of nodes beginning with node $N_0$ includes six nodes, those being $N_0$, $N_d$, $N_e$, $N_1$, $N_f$, and $N_g$, with that line then terminating at block $B_1$; thus, for that line, M=6. Also in this line, assume that g=2. Thus, substituting these values into Equation 2 (or Equation 3.1) solves for S as show in the following Equation 2.5:

$$S = \frac{M}{g} - 1 = \frac{6}{2} - 1 = 2 \quad \text{Equation 2.5}$$

Thus, per Equation 2.5, along the communications-possible line from node $N_0$ through node $N_g$, there is preferably S=2 non-group G nodes between group G nodes $N_0$ and $N_1$. Similarly, from group G node $N_1$ to the end of that line, terminating at block $B_1$, there also are two non-group G nodes, namely, nodes $N_f$ and $N_g$.

Also in FIG. 8, it may be seen that rings $R_2$ and $R_3$ include the next-lowest priority number nodes, relative to nodes $N_0$ and $N_1$. In ring $R_1$, which includes nodes $N_0$, $N_a$, $N_b$, and $N_2$, node $N_2$ is evenly-spaced so that there is one node (i.e., either node $N_a$ or node $N_b$) in the alternative paths between it and node $N_0$. Similarly, in ring $R_2$, which includes nodes $N_0$, $N_c$, $N_d$, and $N_3$, node $N_3$ is evenly-spaced so that there is one node (i.e., either node $N_c$ or node $N_d$) in the alternative paths between it and node $N_0$. With the locations of the various lowest numbered priority nodes in network 80, the number of control frames communicated in network 80 in response to a failure should be diminished as compared to the prior art, thereby improving re-convergence performance.

From the above, one skilled in the art should appreciate that the preferred embodiments provide various bridged computer networks with various benefits. One benefit is an improved determination of bridge priorities in such networks. Another benefit is improved performance with reduced re-convergence time as compared to the prior art. As another benefit, the preferred embodiments have been shown to be useable in various networks, such as both ring and mesh networks and, unlike certain prior art approaches, are not constrained to particular proprietary networks. As still another benefit, while the preferred embodiments are illustrated in terms of integer-ordered bridge priority, various aspects may apply to alternative manners in which priority may be ranked or ordered in a sequential fashion as a general matter, but where that ordering is in part interrupted with discontinuities when applied to a communications-possible line of nodes. These benefits as well as others will be appreciated by one skilled in the art. Indeed, as a final benefit, while the present embodiments have been described in detail, various substitutions, modifications or alterations could be made to the descriptions set forth above without departing from the inventive scope which is defined by the following claims.

The invention claimed is:

1. A bridged network system, comprising: a plurality of bridge nodes; wherein each bridge node in the plurality of bridge nodes is coupled to communicate with at least one other bridge node in the plurality of nodes; wherein bridge nodes in the plurality of bridge nodes are connected to one another to form a communications-possible line of bridge nodes; wherein each bridge node comprises circuitry for associating a bridge priority, selected from a plurality of bridge priorities, with the respective bridge node; wherein the plurality of bridge priorities may be arranged in an ordered sequence; and wherein the bridge priorities associated with successive bridge nodes along the communications-possible line of bridge nodes comprises at least two discontinuities in the ordered sequence, wherein the plurality of bridge priorities comprise integer priority numbers; and wherein each discontinuity in the at least two discontinuities comprises a greater than one difference in the bridge priorities of two adjacent bridge nodes located at the respective discontinuity.

2. The network system of claim 1 and further comprising means for communicating a different bridge priority to each of the plurality of bridge nodes.

3. The network system of claim 2, wherein each bridge node further comprises: circuitry for detecting a failure adjacent the respective bridge node and in response to assert the detecting bridge node as a root node; circuitry for receiving a control frame from another bridge node and, responsive to the received control frame indicating a higher priority number than the bridge priority associated with the receiving bridge node, for asserting the receiving bridge node as a root node by transmitting one or more new control frames; and circuitry for receiving a control frame and, responsive to the received control frame indicating a lower priority number than the bridge priority associated with the receiving bridge node, conceding the root asserted in the received frame and passing a notification onward out of one or more ports on the receiving bridge node.

4. The network system of claim 3 wherein the plurality of bridge nodes comprises a ring network.

5. The network system of claim 4: wherein the ring network comprises an odd number M of nodes; and wherein the at least two discontinuities are located such that the bridge nodes associated with the two lowest priority numbers are located with a one-node-difference number of MX and MX.+−0.1 of nodes, respectively, in two alternative paths between the bridge nodes associated with the two lowest priority numbers.

6. The network system of claim 4: wherein the ring network comprises an even number M of nodes; and wherein the at least two discontinuities are located such that the bridge nodes associated with the two lowest priority numbers are located with a one-node-difference number of MX in two alternative paths between the bridge nodes associated with the two lowest priority numbers.

7. The network system of claim 4 wherein the mesh network is constrained by a spanning tree.

8. The network system of claim 4: wherein the plurality of bridge nodes comprises a number M of bridge nodes; wherein the number M of bridge nodes comprises: a first group having g nodes; and a second group having M-g nodes; wherein each node in the first group causes at least one respective priority discontinuity relative to an adjacent node; and wherein g is an integer portion of {square root over (2M)}.

9. The network system of claim 8: wherein at least one node in the first group is located a node distance, S, from any other node in the first group; and wherein S=round.function.(Mg)−1.

10. The network system of claim 3 wherein the plurality of bridge nodes comprise a mesh network.

11. The network system of claim 10 wherein the mesh network is constrained by a spanning tree.

12. The network system of claim 10: wherein the plurality of bridge nodes comprises a number M of bridge nodes; wherein the number M of bridge nodes comprises: a first group having g nodes; and a second group having M-g nodes; wherein each node in the first group causes at least one respective priority discontinuity relative to an adjacent node; and wherein g is an integer portion of {square root over (2M)}.

13. The network system of claim 1, wherein each bridge node further comprises: circuitry for detecting a failure adjacent the respective bridge node and in response to assert the detecting bridge node as a root node; circuitry for receiving a control frame from another bridge node and, responsive to the received control frame indicating a higher priority number than the bridge priority associated with the receiving bridge node, for asserting the receiving bridge node as a root node by transmitting one or more new control frames; and circuitry for receiving a control frame and, responsive to the received control frame indicating a lower priority number than the bridge priority associated with the receiving bridge node, conceding the root asserted in the received frame and passing a notification onward out of one or more ports on the receiving bridge node.

14. The network system of claim 1 wherein the plurality of bridge nodes comprise a network selected from a group consisting of a ring network and a mesh network.

15. The network system of claim 1: wherein the plurality of bridge nodes comprises a number M of bridge nodes; wherein the number M of bridge nodes comprises: a first group having g nodes; and a second group having M-g nodes; wherein each node in the first group causes at least one respective priority discontinuity relative to an adjacent node; and wherein g is an integer portion of {square root over (2M)}.

16. The network system of claim 15: wherein at least one node in the first group is located a node distance, S, from any other node in the first group; and wherein S=round.times..times.(Mg)−1.

17. A method of operating a network system, the network system comprising a plurality of bridge nodes, wherein each bridge node in the plurality of bridge nodes is coupled to communicate with at least one other bridge node in the plurality of nodes and the plurality or bridge nodes are connected to one another to form a communications-possible line of bridge nodes, the method comprising: for each bridge node in the plurality of bridge nodes, selecting a bridge priority from a plurality of bridge priorities, wherein the plurality of bridge priorities may be arranged in an ordered sequence; and communicating each selected bridge priority to an associated bridge node such that the communications-possible line of bridge nodes comprises at least two discontinuities in the ordered sequence, wherein the plurality of bridge priorities comprise integer priority numbers; and wherein each discontinuity in the at least two discontinuities comprises a greater than one difference in the bridge priorities of two adjacent bridge nodes located at the respective discontinuity.

18. The method of claim 17, wherein each bridge node is further operable to perform the step of: detecting a failure adjacent the respective bridge node and in response to assert the detecting bridge node as a root node; receiving a control frame from another bridge node and, responsive to the received control frame indicating a higher priority number than the bridge priority associated with the receiving bridge node, asserting the receiving bridge node as a root node by transmitting one or more new control frames; and receiving a control frame and, responsive to the received control frame indicating a lower priority number than the bridge priority associated with the receiving bridge node, conceding the root asserted in the received frame and passing a notification onward out of one or more ports on the receiving bridge node.

19. The method of claim 17 wherein the plurality of bridge nodes comprises a network selected from a group consisting of a ring network and a mesh network.

20. The method of claim 17: wherein the plurality of bridge nodes comprises a number M of bridge nodes; wherein the number M of bridge nodes comprises: a first group having g nodes; and a second group having M-g nodes; wherein each node in the first group causes at least one respective priority discontinuity relative to an adjacent node; and wherein g is an integer portion of {square root over (2M)}.

21. The method of claim 20: wherein at least one node in the first group is located a node distance, S, from any other node in the first group; and wherein S=round.times..times.(Mg)−1.

* * * * *